(12) United States Patent
Yamada (10) Patent No.: US 6,934,049 B1
(45) Date of Patent: Aug. 23, 2005

(54) DATA PROCESSING APPARATUS

(75) Inventor: Hirokazu Yamada, Kobe (JP)

(73) Assignee: Minolta Co., Ltd., Osaka (JP)

( * ) Notice: Subject to any disclaimer, the term of this patent is extended or adjusted under 35 U.S.C. 154(b) by 818 days.

(21) Appl. No.: 09/661,039

(22) Filed: Sep. 13, 2000

(30) Foreign Application Priority Data

| Sep. 13, 1999 | (JP) | ................................ 11-258728 |
| Sep. 13, 1999 | (JP) | ................................ 11-258730 |
| Sep. 13, 1999 | (JP) | ................................ 11-258732 |
| Sep. 13, 1999 | (JP) | ................................ 11-258736 |

(51) Int. Cl.$^7$ ............................................. G06F 15/00

(52) U.S. Cl. ...................... 358/1.16; 358/1.9; 358/1.12

(58) Field of Search ............................... 358/1.9, 1.12, 358/540, 526, 1.16, 1.15, 1.17; 347/116, 347/117

(56) References Cited

U.S. PATENT DOCUMENTS 5,887,125 A * 3/1999 Takano et al. ............. 358/1.12
6,665,452 B1 * 12/2003 Takemoto et al. .......... 382/289

FOREIGN PATENT DOCUMENTS

| JP | 6-125465  | 5/1994  |
| JP | 9-234905  | 9/1997  |
| JP | 10-315545 | 12/1998 |

* cited by examiner

Primary Examiner—Twyler Lamb
(74) Attorney, Agent, or Firm—McDermott Will & Emery LLP (57) ABSTRACT

An apparatus for performing image formation in overlapping relation on a single sheet by using a plurality of print heads arranged in a row, wherein the apparatus has a first correction portion for correcting image data on one line basis in a sub-scanning direction based on the amount of relative inclination between the print heads; and a second correction portion for correcting the image data corrected by the first correction portion on a unit basis smaller than one line.

12 Claims, 13 Drawing Sheets

DATA PROCESSING APPARATUS

This application is based on application Nos. Hei 11-258728, Hei 11-258730, Hei 11-258732 and Hei 11-258736 filed in Japan, the content of which is hereby incorporated by reference.

FIELD OF THE INVENTION

The present invention relates to a processing apparatus for correcting image data and, more particularly, to an apparatus for forming an image by superimposing a plurality of colors based on image data on the plurality of colors.

DESCRIPTION OF THE RELATED ART

In a tandem-type image forming apparatus such as a tandem-type color printer or a tandem-type color copier, recording units (print heads) for the four colors of yellow (Y), magenta (M), cyan (C), and black (K) are arranged in a row. In the image forming apparatus, a plurality of toner images C, M, Y, and K generated by these recording units are superimposed and transferred onto a single sheet to form a color image.

To increase the quality of color printing, misregistration of the transferred toner images in the plurality of colors should be reduced. The misregistration includes misregistration in the main scanning direction which is perpendicular to the direction of sheet transportation, misregistration in the sub-scanning direction which is the direction of sheet transportation, and misregistration based on the amount of skew of the inclination of a line in the main scanning direction. Misregistration between the print heads is classified into three types, which are misregistration in the main scanning direction, misregistration in the sub-scanning direction, and inclinational misregistration. The misregistrations in the main scanning direction and in the sub-scanning direction can be corrected relatively easily by controlling the timing with which data on the individual colors is outputted from a printer controller. For the inclinational misregistration, however, it becomes necessary to correct image data in accordance with the amount of inclination. For smooth printing of a corrected image, correction should be performed on a unit basis smaller than one pixel.

For the correction of skew produced between the print heads, the inclination can be reduced by disposing a line buffer equivalent to the maximum amount of inclination that requires correction immediately anterior to the print heads and correcting the image data in accordance with the amount of inclination by using the line buffer. However, this method requires a large quantity of memories operable at a high speed for correction and, if the maximum inclination assumed is exceeded, correction cannot be performed.

SUMMARY Of THE INVENTION

An image forming apparatus according to the present invention is an apparatus for performing image formation in overlapping relation on a single sheet by using a plurality of print heads arranged in a row, the apparatus comprising: first correcting means for correcting image data on a line basis in a sub-scanning direction based on the amount of relative inclination between the print heads; and second correcting means for correcting the image data corrected by the first correcting means on a unit basis smaller than one line.

By performing correction in the two separate operations, it is possible to perform the correction on a 1-line basis in an image memory and perform the correction on a unit basis smaller than one line in a FIFO memory or a print head portion. This reduces the quantity of special memories required for correction, such as FIFO memories, and achieves lower cost.

In the image forming apparatus, the amount of inclination is detected as an integral multiple of a unit for correction in the correction performed by the second correcting means on a unit basis smaller than one line.

This simplifies the structure of the second correcting means and enables a high-accuracy correcting process.

An image forming apparatus according to the present invention is an apparatus for performing image formation in overlapping relation on a single sheet by using a plurality of print heads arranged in a row, the apparatus comprising: a bit map memory having an image data region for storing image data and respective blank regions provided on leading and rear end portions of the image data region; a read address generating unit for sequentially generating read addresses from a leading address in the image data region of the bitmap memory; a write address generating unit for generating, from the read addresses, write addresses by correcting relative inclination between the print heads on a line basis; and a memory control unit for reading, from the read addresses generated by the read address generating unit, image data stored in the image region of the bitmap memory and writing the image data at the write addresses generated by the write address generating unit. Preferably, the dimensions of the blank regions is equal to or larger than the maximum amount of inclination to be corrected.

Since the respective blank regions (white data regions) are provided on the leading and rear end portions of the image data, the memory control unit can perform correction on a line basis by transferring the image data in the bitmap memory. By transmitting, to the print heads, the image data that has been corrected preliminarily against the relative inclination between the print heads, the inclination can be cancelled out.

An image forming apparatus according to the present invention is an apparatus for performing image formation in overlapping relation on a single sheet by using a plurality of print heads arranged in a row, the apparatus comprising: a bitmap memory having an image data region for storing image data and specified blank regions provided on leading and rear end portions of the image data region, respectively; a read address generating unit for generating read addresses for image data based on correction data on relative inclination between the print heads; and an output unit for reading the image data from the generated read addresses.

In the arrangement, the apparatus outputs the image data in the bitmap memory at a high speed, while performing a correcting process with respect thereto, in correcting skew produced between the print heads.

Since the apparatus outputs the image data in the bitmap, while performing the correction on a line basis, the correction can be performed on a unit basis equal to or smaller than one line in a buffer memory having a capacity of at least one line of data.

An image forming apparatus according to the present invention is an apparatus for image formation in overlapping relation on a single sheet by using a plurality of print heads arranged in a row, the apparatus comprising: a bitmap memory for storing image data; a read address generating unit for consecutively generating read addresses for image data based on relative inclination between the print heads on the unit basis of one burst access; and a memory control unit for reading the image data from the bitmap memory at the read addresses generated by the read address generating unit.

The apparatus further comprises storing means for temporarily storing the read image data, the storing means having a capacity of at least one line of data, wherein the memory control unit comprises a selecting unit for selectively outputting either of the image data read from the bitmap memory and the image data stored in the storing means based on the relative inclination between the print heads.

The apparatus further comprises storing means for temporarily storing the read image data, the storing means having a capacity of at least one line of data and storing, of the data read by a burst access from the addresses generated by the read address generating unit, data of the length of a specified unit for correction.

These and other objects, advantages and features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DESCRIPTION OF THE PREFERRED EMBODIMENTS

Referring now to the accompanying drawings, the embodiments of the present invention will be described. In the drawings, the same reference numerals designate identical or equivalent components.

Figure 1:
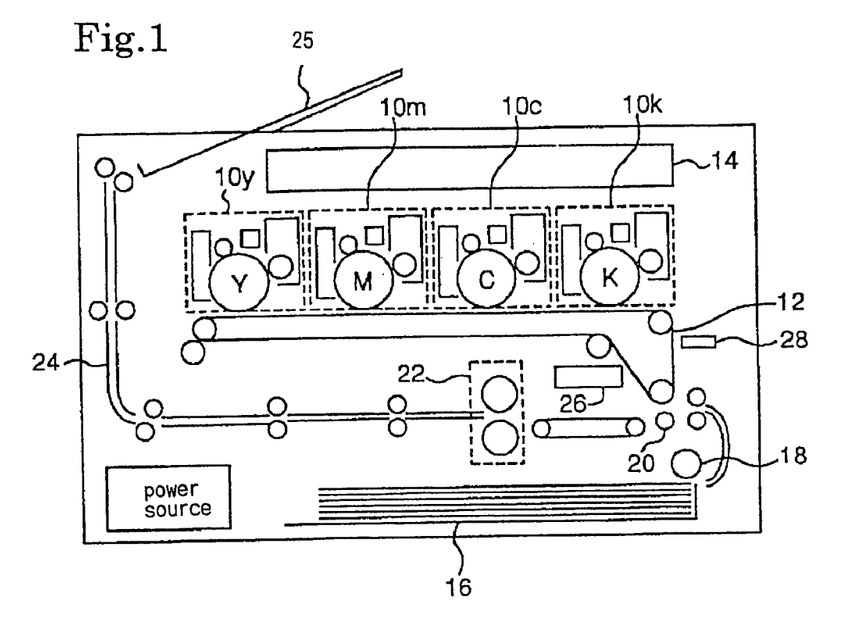
FIG. 1 is a cross-sectional view of the overall structure of a color printer.

FIG. 1 shows a schematic structure of a tandem-type color printer to which the present invention has been applied.

Imaging units 10y, 10m, 10c, and 10k for the four colors of yellow (Y), magenta (M), cyan (C), and black (K) are successively arranged in a row in the direction (sub-scanning direction) in which a sheet on a transfer belt 12 moves. In each of the imaging units 10y, 10m, 10c, and 10k, elements necessary to perform an electrophotographic process are disposed around a photosensitive member having a rotation axis disposed in the main scanning direction. With the photosensitive members for Y, M, C, and K image formation rotating counterclockwise in the drawing, an image formation process is performed continually in the imaging units 10y, 10m, 10c, and 10k. Image data transmitted from a host is converted into individual sets of data for printing in yellow, magenta, cyan, and black in a control unit 14, which are transmitted to respective exposing heads in the imaging units 10y, 10m, 10c, and 10k. Each of the exposing heads emits laser light in response to an electric signal of the transmitted set of image data, scans the photosensitive member with the light in the main scanning direction by using a polygon mirror, and thereby exposes the photosensitive member. Latent images formed on the photosensitive members are developed with toners in the individual colors. The toner images on the photosensitive members are transferred in overlapping relation to the transfer belt 12 by a transfer charge (not shown) disposed in the transfer belt 12 in opposing relation to each of the photosensitive members. On the other hand, the sheet is transmitted from a sheet feeding cassette 16 by a pickup roller 18. The toner images on the transfer belt 12 are transferred onto the sheet by the transfer roller 20. The toner images are melted with the application of heat and fixed onto the sheet by a fixing unit 22 and then discharged into a tray 25 via a sheet transport path 24. The toners remaining on the transfer belt 12 after the transfer are removed by a cleaner 26.

Most downstream of the imaging units 10y, 10m, 10c, and 10k, three resist correction sensors 28 are arranged in a row in a direction (in the main scanning direction) perpendicular to the direction of transport of the belt 12. When a resist pattern is formed on the transfer belt 12 by using the imaging units 10y, 10m, 10c, and 10k, the sensors detect the amount of color misregistration of the Y, M, C, and K toner images in the main and sub-scanning directions such that the image data control unit corrects an image forming position and image distortion. This prevents color misregistration of the Y, M, C, and K toner images on the sheet.

Figure 2:
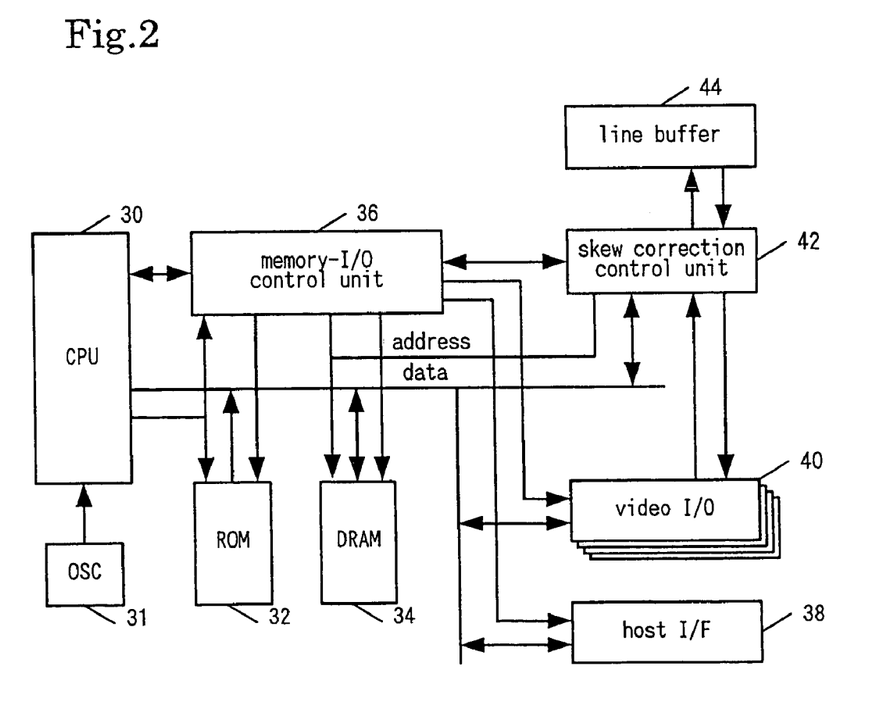
FIG. 2 is a block diagram of an image data control unit.

In the control unit 14 shown in FIG. 2, a CPU 30 controls the operation of the whole control unit. To the CPU 30, a ROM 32 and a DRAM 34 are connected. On the other hand, a memory-I/O control unit 36 controls a memory and signal inputting and outputting from and to the outside. The CPU 30 is also connected to a host interface unit 38, a video interface unit 40, and a skew correction control unit 42. Image data is stored in the DRAM 34 via the host interface unit 38. The skew correction control unit 42 controls skew correction by using a line buffer 44.

Figure 3:
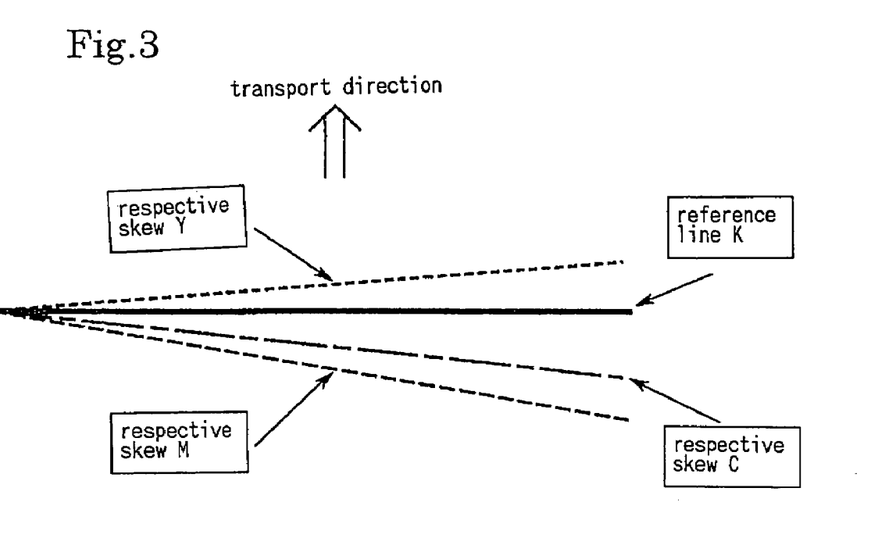
FIG. 3 is a view for illustrating the concept of skew correction.

Next, a description will be given to skew correction. FIG. 3 shows an example of skew between the print heads in the imaging units 10y, 10m, 10c, and 10k. Here, respective skew distortions of yellow, magenta, and cyan are presented relative to the line in black (K) as a reference. The skew distortions are due to the inclinations of the print heads or the like and detected by the resist correction sensors 28.

Figure 4:
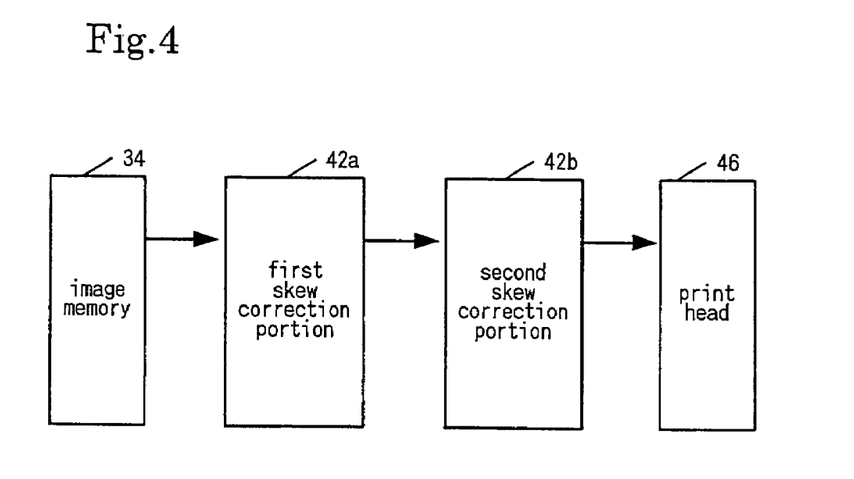
FIG. 4 is a view showing the procedure of skew correction.

FIG. 4 shows the outline of a correcting procedure by the skew correction control unit 42. A first skew correcting portion 42a performs rough skew correction on a 1-line basis for mechanical variations of the print heads with respect in the image data in an image memory (DRAM 34). Next, a second skew correcting portion 42b performs skew correction on a unit basis smaller than one line with respect to the data corrected by the first skew correcting portion. In the present embodiment, it is assumed that printing can be controlled on a ⅓-dot basis in the sub-scanning direction. In the case of performing skew correction on a ⅓-line basis, therefore, the second skew correcting portion 42b uses appropriately correction data of 3n (n is a natural number), which is an integral multiple of the divisor. In this case, the amount of 1-line-based correction can be adjusted to n and processing can be performed with a simple circuit. Specifically, if the correction data on a ⅓-line basis is assumed to be 3n+1 or 3n+2, a fraction is produced so that an additional circuit for processing the fraction becomes necessary. If the correction data is assumed to be 3n, correctable accuracy is reduced to ⅓ but the processing of the fraction described above becomes unnecessary and the circuit can be simplified. Obtained image data is transmitted to the print heads. By thus performing correction in the two separate operations, it is possible to perform, e.g., the correction on a 1-line basis in the image memory and the correction on a unit basis smaller than one line in a FIFO memory or in the print head. This reduces the quantity of special memories required for correction, such as FIFO memories, and achieves lower cost.

Figure 5:
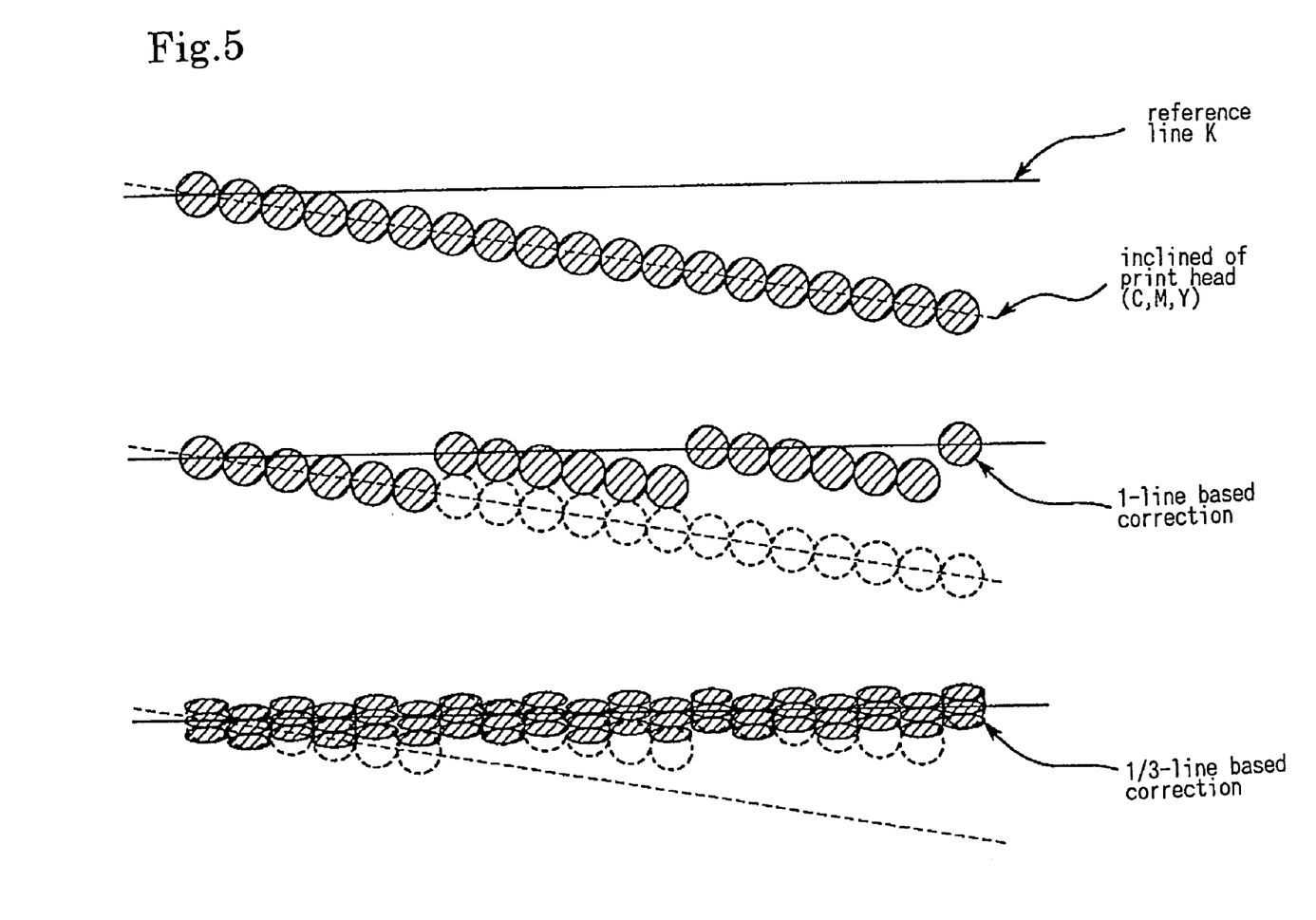
FIG. 5 is a view showing an example of skew correction.

It is assumed here that the line formed by the yellow, magenta, or cyan print head is inclined relative to the black line as the reference and a skew distortion has been caused thereby, as shown in the upper portion of FIG. 5. Here, the solid circle represents one dot. As shown in the middle portion of FIG. 5, the first skew correcting portion 42a performs the 1-line-based correction. As subsequently shown in the lower portion of FIG. 5, the second skew correcting portion 42b performs the ⅓-line-based correction. By effecting printing by using data after correction, the skew distortion can be reduced to a degree smaller than one line.

In the present embodiment, the 1-line-based skew correction is performed by processing, in the memory, image data stored in the bitmap memory region within the DRAM 34. By transmitting, to the print head, image data that has been previously corrected against the skew distortion, the skew distortion can be cancelled out.

Figure 6A:
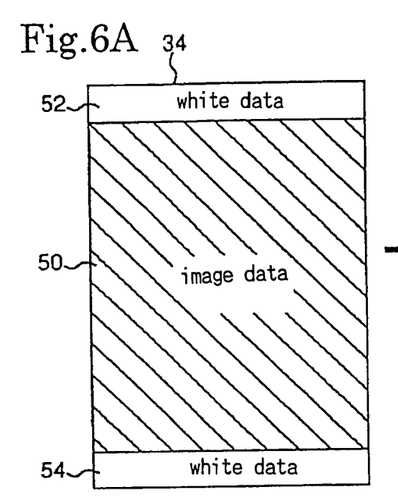
FIGS. 6A, 6B, 6C and 6D are views for illustrating skew correction in a memory.

FIGS. 6A, 6B, 6C and 6D are representations of image data in a two-dimensional space in skew correction. A description will be given to the correction within the memory with reference to FIG. 6. As shown in FIG. 6A, respective white data regions are provided in the leading end portion (upper portion in the drawing) 52 of the image data (before correction) 50 received from the host and in the rear end portion (lower portion in the drawing) 52 thereof in the bitmap memory. The white data regions have dimensions equal to or larger than the maximum amount of inclination to be corrected.

Figure 6B:
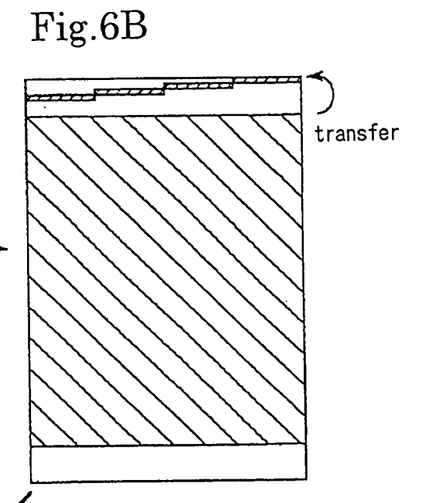
Figure 6C:
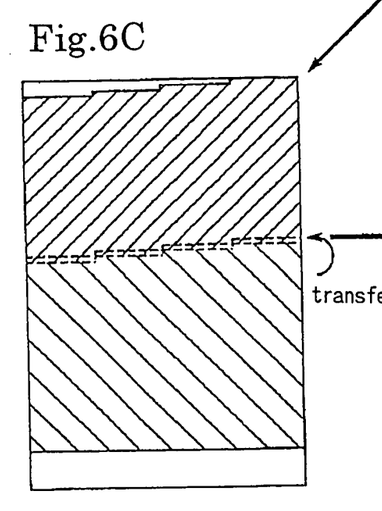
Figure 6D:
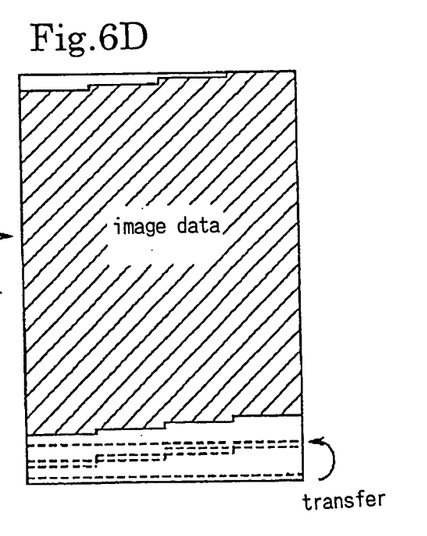

In the skew correction, the first line of the image data 50 before correction is initially transferred to the upper white region 52 by using the line buffer 44, as shown in FIG. 6B. The position to which the first line is transferred becomes oblique in response to the skew distortion detected by the resist correction sensors 28. Here, the image data in the uppermost portion is transferred to the position in contact with the uppermost portion of the white region 52. Likewise, data on the second and subsequent lines is transferred sequentially to the positions subsequent to the data on the first line, as shown in FIG. 6C. FIG. 6D shows image data after the completion of the transfer. Since data in the white region 54 is similarly transferred, white data is stored automatically in a lower portion of the image data where the image data no more exists. Thus, the white region on the lower side of the image is expanded to the upper side, which obviates the necessity for the process of removing data in the portion of the bitmap memory where the image data does not exist during data transfer or after data transfer.

Figure 7:
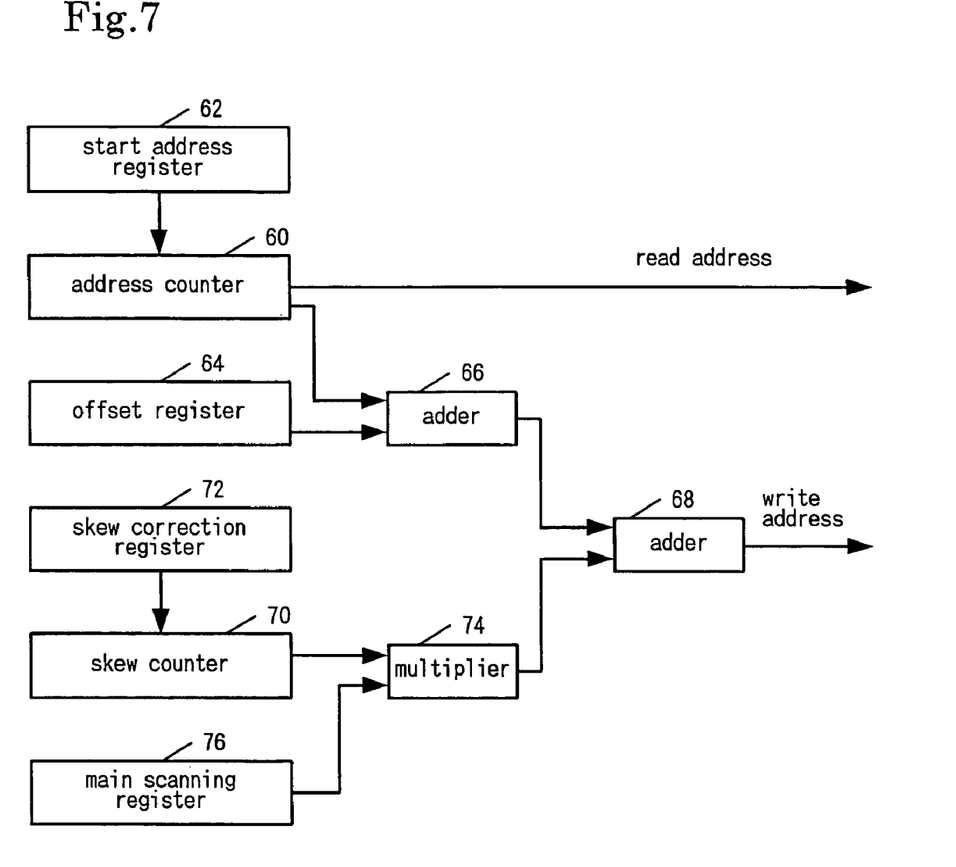
FIG. 7 is a block diagram of an address generating circuit.

FIG. 7 shows an address generating circuit when skew correction is performed within the memory 34, as shown in FIGS. 6A–6D. The address generating circuit is in the skew correction control unit 42. In the address generating circuit, an address counter 60 counts in response to an image clock by using a start address stored in a start address register 62 as an initial value. In a read operation, if an image clock signal is inputted, the address counter 60 increments the count value by 1 and outputs the incremented count value as a read address. In a write operation, the count value in the address counter 60 and an offset value stored in an offset register 64 are added up by a first adder 66 and outputted to a second adder 68. If a pixel clock signal is inputted, on the other hand, a skew counter 70 receives, in response to a line synchronizing signal, a skew correction value stored in a skew correction value register 72 and counts by using the skew correction value as an initial value. A multiplier 74 calculates the product of the count value in the skew counter 70 and a value in a main scanning register 76 and outputs the calculated product as a value obtained by skew correction to the second adder 68. The second adder 68 adds up the two input values and outputs the sum as a write address.

Figure 8A:
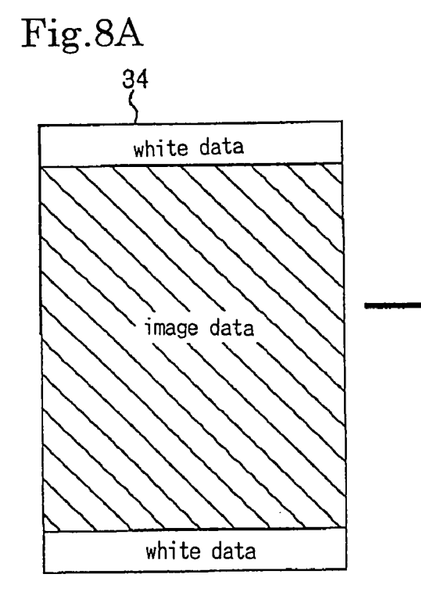
FIGS. 8A, 8B, 8C and 8D are views for illustrating skew correction in reading data from the memory.
Figure 8B:
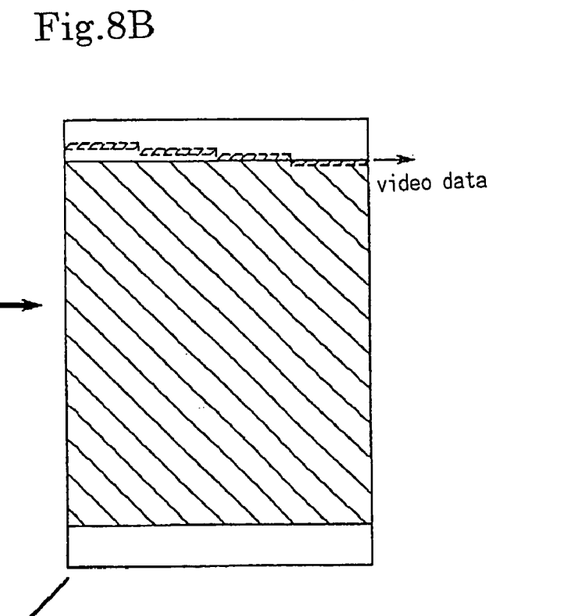
Figure 8C:
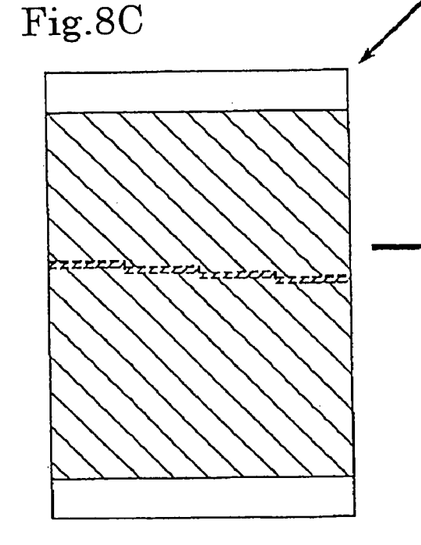
Figure 8D:
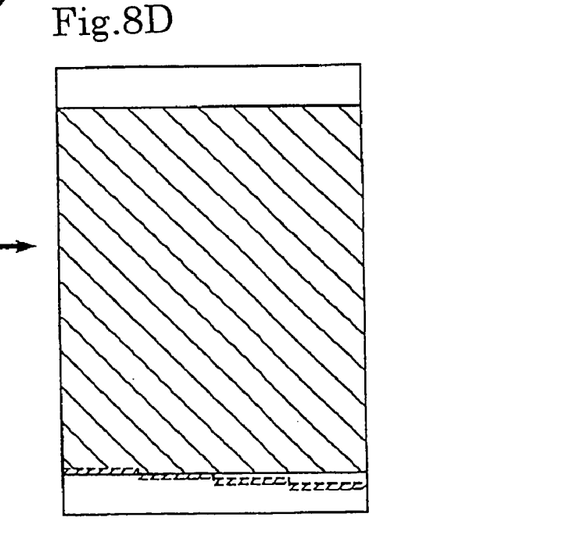

In another embodiment, correction is performed while image data in the bitmap memory is outputted at a high speed in line-based skew correction. If a description is given with reference to FIGS. 8A, 8B, 8C and 8D, respective white data regions are provided in the upper and lower portions of image data received from the host in a two-dimensional space, as shown in FIG. 8A. The white data regions have dimensions equal to or larger than the maximum amount of inclination to be corrected (this is the same as in the case of the first embodiment shown in FIGS. 6A–6D). In skew correction, the address generating circuit (see FIG. 13) generates a read address the position of which is represented by oblique lines in response to correction data on a skew distortion. That is, in the two dimensional space, image data stored as shown in FIG. 8A is read obliquely so as to cancel out the skew distortion. First, as shown in FIG. 8B, the first line of the image data is read as video data at a read position represented by the oblique lines. Of the first line, only the data of the final ¼ part is image data. Data of the second and subsequent lines is similarly transferred to the positions subsequent to the first line, as shown in FIG. 8C. FIG. 8D shows the final reading of the final line of the image data. Of the final line, only the data of the initial ¼ part is image data.

Figure 9:
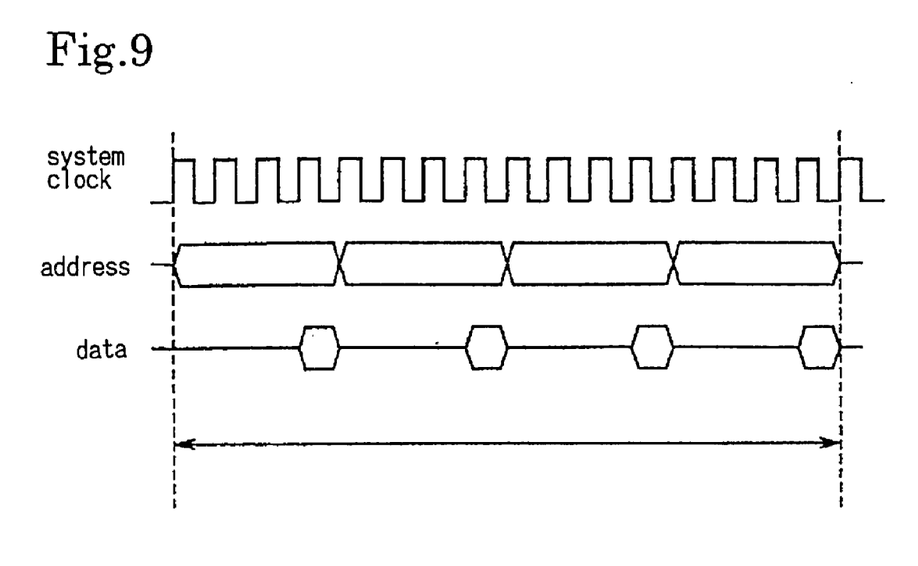
FIG. 9 is a timing chart of a conventional access.
Figure 10:
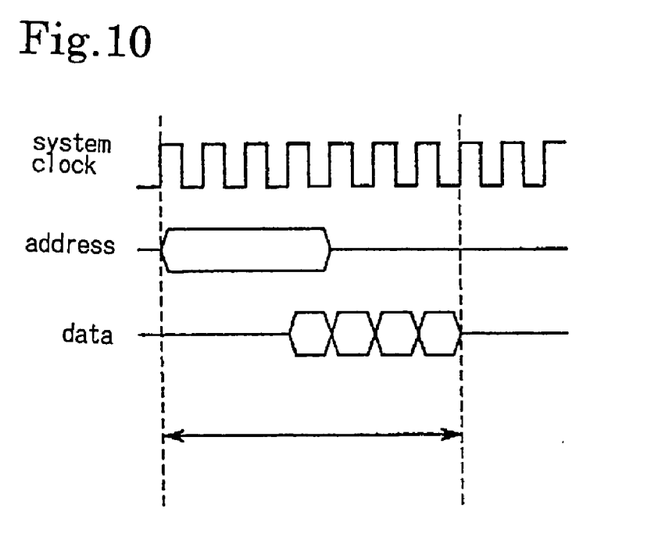
FIG. 10 is a timing chart of a burst access.

Next, a description will be given to a burst access mode. Conventionally, image data has been read out of predetermined addresses on a 1-word basis, as shown in, e.g., the access timing chart of FIG. 9. Here, an access to data for 4 words is shown. By contrast, the present embodiment reads image data by a burst access. In the burst access, if a leading address is specified, data for a plurality of words (here, 4 words) is accessed collectively. FIG. 10 shows the timing for the burst access. In line-based correction, image data is read on the basis of the plurality of words by the burst access. Accordingly, 4 sets of data are read consecutively by generating an address at which data is read from the bitmap memory on the basis of one burst access. That is, if the address is outputted, data at four addresses including the address is accessed consecutively. Since the reading of the image data is performed by the burst access, it will be understood by comparison with FIG. 9 that an access time can be reduced and a correcting process can be performed at a higher speed.

Figure 11:
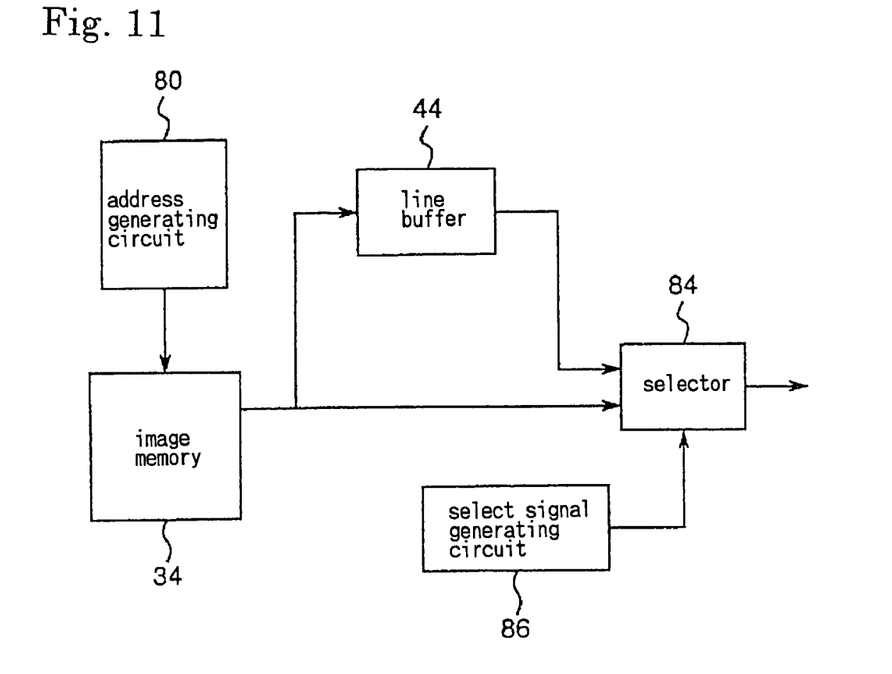
FIG. 11 is a 1-line-based correcting circuit diagram.

Next, a description will be given to the 1-line-based correcting circuit 42*a* with reference to FIG. 11. Addresses for one line of data are outputted sequentially from an address generating circuit (see FIG. 13) 80 to the image memory 34 by a burst access. The output data from the image memory 34 is transmitted directly to a selector 84, while it is also transmitted to the selector 84 via the line buffer 44. The selector 84 synthesizes, on a pixel basis, one line of image data from two lines of data in response to a select signal from a select signal generating circuit 86 (see FIG. 14) and outputs the synthesized data.

Figure 12:
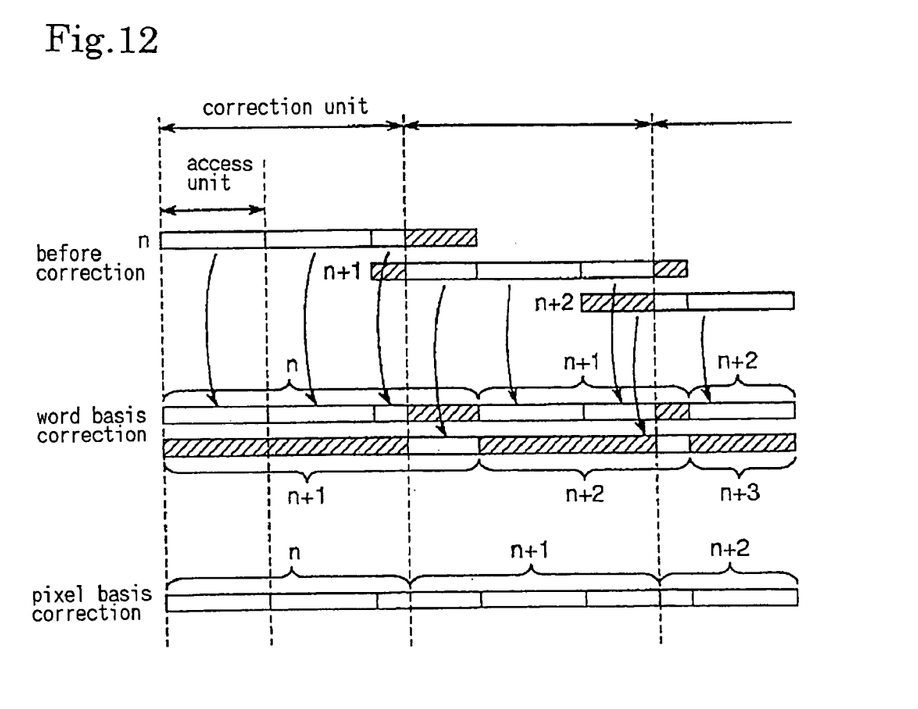
FIG. 12 is a timing chart of correction by the burst access.

Referring to FIG. 12, a description will be given to skew correction using the bust access performed in the 1-line-based correcting circuit 42*a*. For the skew correction, data before correction is read on a word basis in a two dimensional space. The unit for skew correction based on the inclination of the print heads (hereinafter referred to as a correction unit) is not necessarily an integral multiple of a unit in which data is read by one burst access (hereinafter referred to as an access unit). In the upper stage of FIG. 12, it is shown that, for the data before correction, data read by the n-th, (n+1)-th, and (n+2)-th burst accesses is in overlapping relation. If data is read in the access unit, therefore, unwanted data shown in the hatched portions is also read. It follows that necessary data in overlapping relation to the unwanted data cannot be read. Therefore, correction is performed by using the 1-line line buffer (FIFO memory) 44 as shown in the middle stage of FIG. 11. In the example shown in the drawing, the portions of data in the three correction units that have been already shown in hollow portions are stored in the line buffer 44, as indicated by the arrows. Although the hatched portions are read by the burst accesses, they are not included in the correction units so that they represent the portions not stored in the line buffer 44. When image data is newly read by the subsequent access, data that has not be read by the previous access (the hollow portions) is synthesized at the corresponding position of the line, as indicated by the arrows, while it is also stored in the line buffer 44 simultaneously. Thus, as shown in the lower stage of FIG. 12, one line of data is synthesized on a pixel basis from two lines of data.

Figure 13:
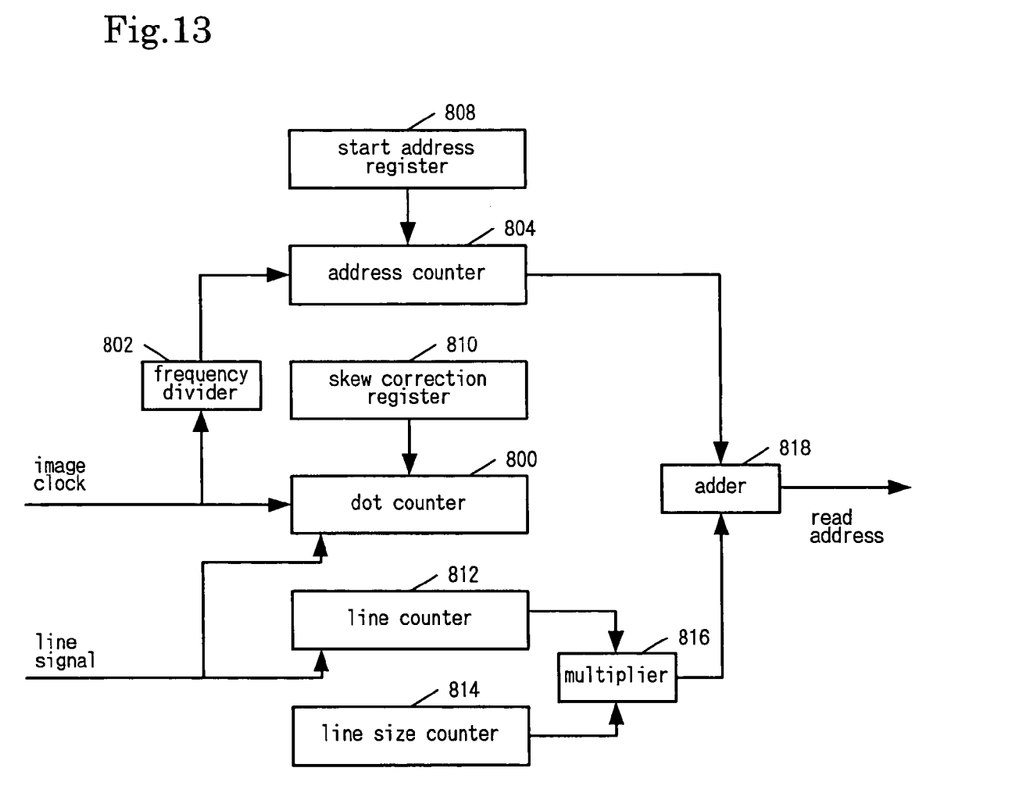
FIG. 13 is a block diagram of an address generating circuit.

FIG. 13 is a block diagram of an address generating circuit 80 based on the burst access. An image clock is inputted to a dot counter 800 and a frequency divider 802. The frequency divider 802 divides the frequency of the image clock into units in which the burst access is made (access unit) and transmits it to an address counter 804. The address counter 804 is incremeneted based on the access unit by using a start address inputted from a start address register 806 as an initial value and outputs the address to an adder 808.

On the other hand, the dot counter 800 outputs a count pulse to a line counter 812 every time the unit of pixels to be corrected, which is stored in a skew correction value counter 810, is reached. The output value from the line counter 812 and the line size from a line size register 814 are added up by an adder 816 and the sum is outputted to an adder 818. As a consequence, the multiplier 816 calculates the number of lines to be corrected. The dot counter 800 and the line counter 812 are reset by the line synchronizing signal. The adder 818 adds up the two input values and outputs a read address.

Figure 14:
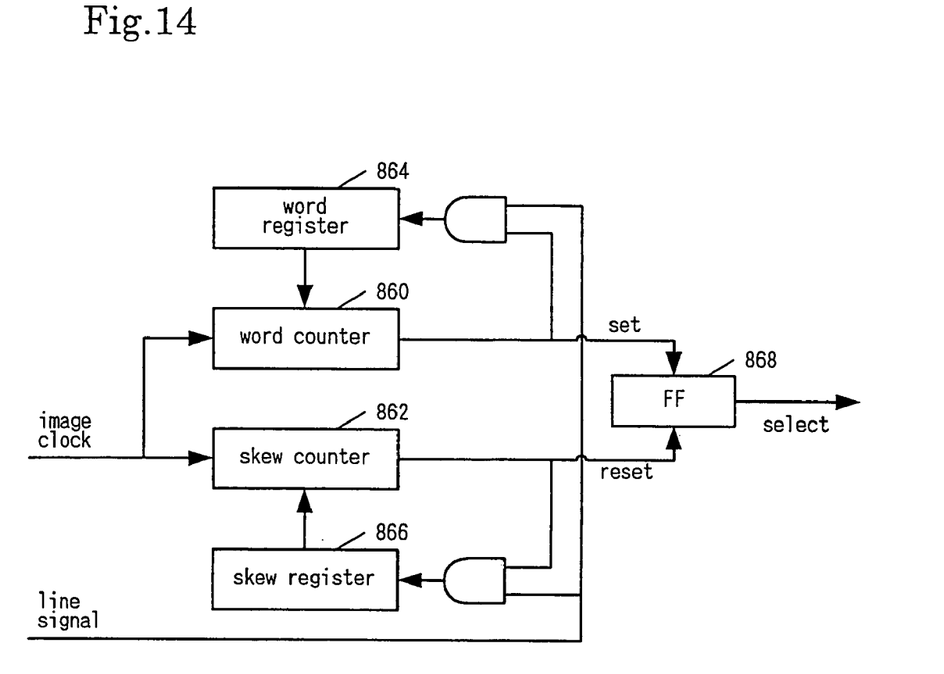
FIG. 14 is a block diagram of a select signal generating circuit.
Figure 15:
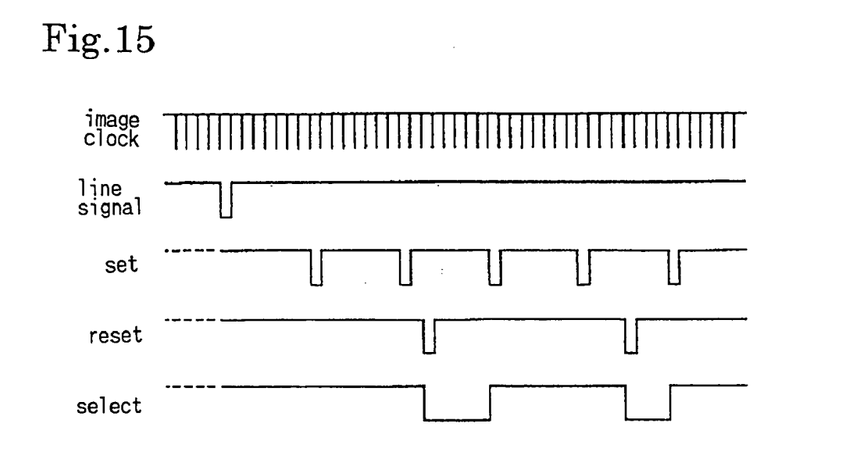
FIG. 15 is a timing chart of the select signal generating circuit.

FIG. 14 is a block diagram of a select signal generating circuit 86 and FIG. 15 is a timing chart thereof. A word counter 860 and a skew counter 862 are repeat counters for counting pixel clocks. The word counter 860 is reset every time the unit for burst access (access unit), which is stored in a word register 864, is reached and the skew counter 862 is reset every time the unit of pixels to be corrected, which is stored in a skew register 866, is reached. The skew register 866 resets the skew counter 862 by outputting the value stored therein in response to an output signal from the skew counter 862 or to the line synchronizing signal. The word register 862 resets the word counter 860 by outputting the value stored therein in response to an output signal from the word counter 860 or to the line synchronizing signal. A flip-flop 868 is reset in response to the output signal from the skew counter 862 and set in response to the output signal from the word counter 864 to output a select signal. When the select signal is set, data from the line buffer 44 is selected. When the select signal is reset, data from the image memory 34 is selected.

As described above, the respective white data regions are provided in the leading and rear end portions of the image data in the bitmap memory (see the upper left portion (a) of FIG. 8) and image data is outputted, while line-based correction is made by using the line buffer 44. Thus, the 1-line-based correction can be performed by using the line buffer 44 having a capacity of at least one line of data. This reduces the quantity of special memories required for skew correction, such as FIFO memories, and achieves lower cost.

For smooth printing of an image, the correction should be performed on a unit basis smaller than one pixel. Next, a description will be given to the correction performed by the second skew correcting portion 42*b* on a unit basis smaller than one line (in the present embodiment, on a ⅓ line basis). As shown in FIG. 4, the correction on a unit basis smaller than one line is made with respect to image data that has been corrected on a 1-line basis by the first skew correcting portion 42*a*. In the correction performed on a unit basis smaller than one line, printing is controlled on a ⅓-line basis in the sub-scanning direction, as shown in FIG. 5.

Figure 16:
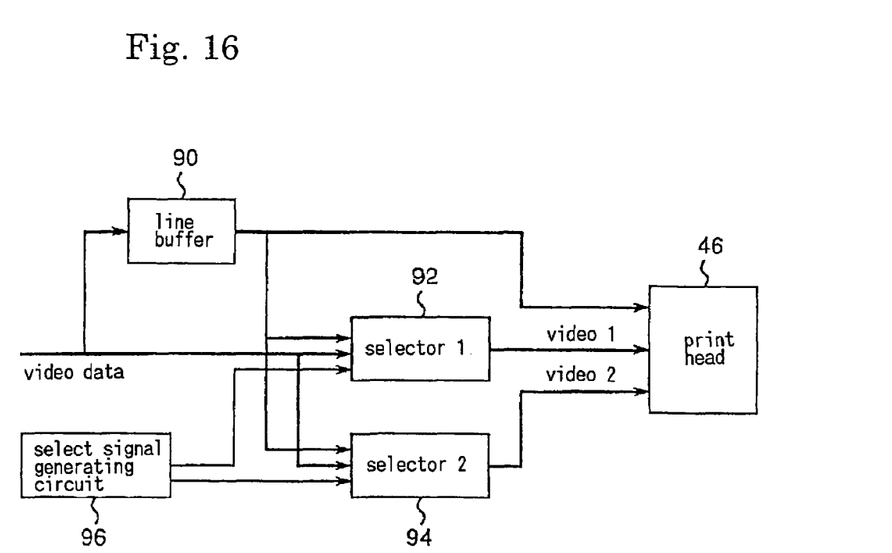
FIG. 16 is a ⅓-line-based correcting circuit diagram.

FIG. 16 shows the ⅓-line-based correcting circuit 42*b* and a print head 46. Video data that has been already corrected on a 1-line basis is delayed via a line buffer 90. The video data or the video data delayed by one line is outputted as a video 0 signal, a video 1 signal, and a video 2 signal to the print head 46 (see FIG. 19). The video 0 signal, the video 1 signal, and the video 2 signal represent printing data to be printed sequentially on a ⅓-line basis. The video 0 signal represents the video data delayed via the line buffer 90. On the other hand, the vide data and output data from the line buffer are outputted to a first selector 92 and a second selector 94, respectively. The first selector 92 and the second selector 94 output, as a video 1 signal and a video 2 signal, video data selected in consideration of the skew in response to a select 1 signal and a select 2 signal from a select signal generating circuit 96 (see FIG. 17) to the print head 46.

Figure 17:
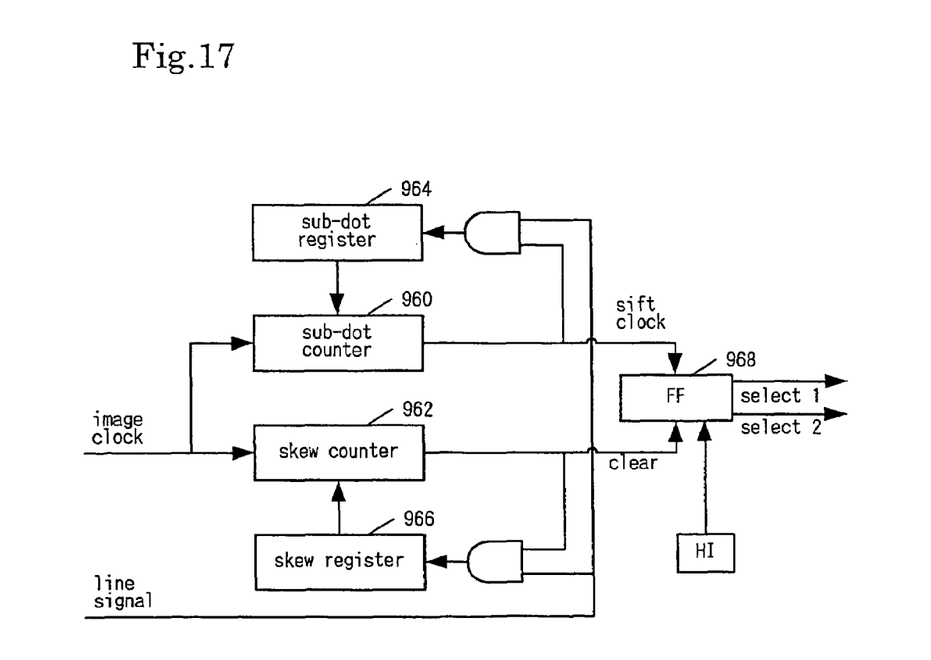
FIG. 17 is a block diagram of the select signal generating circuit.
Figure 18:
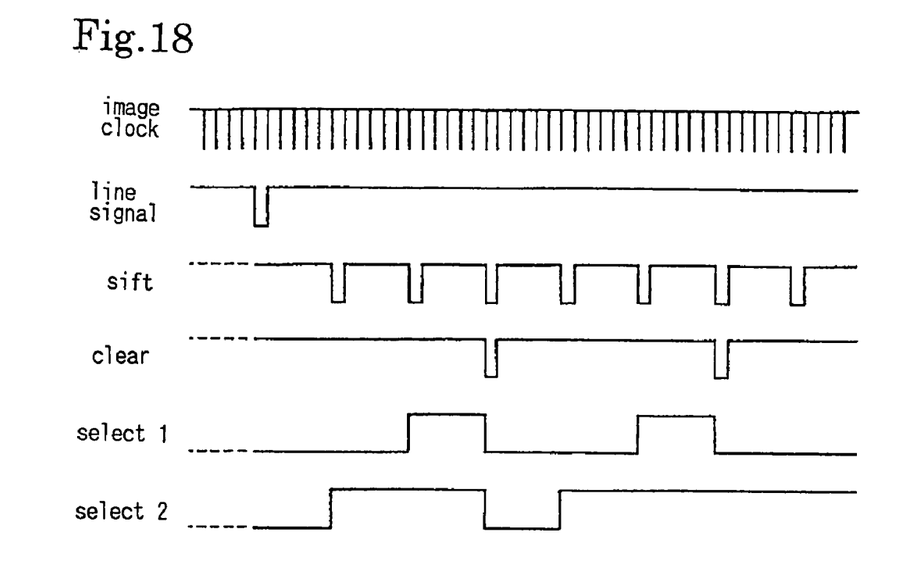
FIG. 18 is a timing chart of the select signal generating circuit.

FIG. 17 shows a structure of the select signal generating circuit 96. FIG. 18 shows a timing chart of the select signal generating circuit 96. In the select signal generating circuit 96, a sub-dot counter 960 and a skew counter 962 count image clocks. The sub-dot counter 960 is reset every time the numeric value stored in a sub-dot register 964 is reached. On the other hand, the skew counter 962 is reset every time the numeric value stored in a skew register 966 is reached. The skew register 966 outputs the value stored therein in response to an output signal from the skew counter 962 or to the line synchronizing signal, while the sub-dot register 964 outputs the value stored therein in response to an output signal from the sub-dot counter 960 or to the line synchronizing signal. A shift register 968 is reset in response to the output signal from the skew counter 962 and shifts an input signal on the H level to output the select 1 signal and the select 2 signal in response to the output signal from the sub-dot counter 960.

As shown in FIG. 18, the sub-dot counter 960 and the skew counter 962 are reset in response to the line synchronizing signal to initiate counting and output a shift clock signal and a clear signal, respectively. In response to these, the shift register 968 outputs the select 1 signal and the select 2 signal. As a consequence, the first elector 92 outputs the video 1 signal to the print head 46 upon receipt of the select 1 signal, while the second selector 94 outputs the video 2 signal to the print head 46 upon receipt of the select 2 signal.

Figure 19:
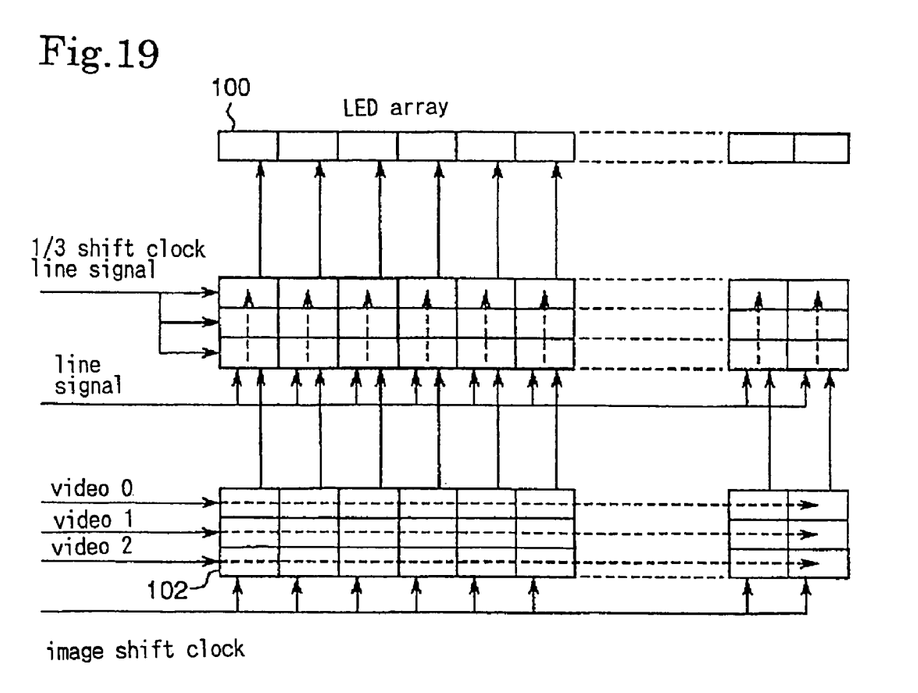
FIG. 19 is a view showing a structure of a print head portion.
Figure 20:
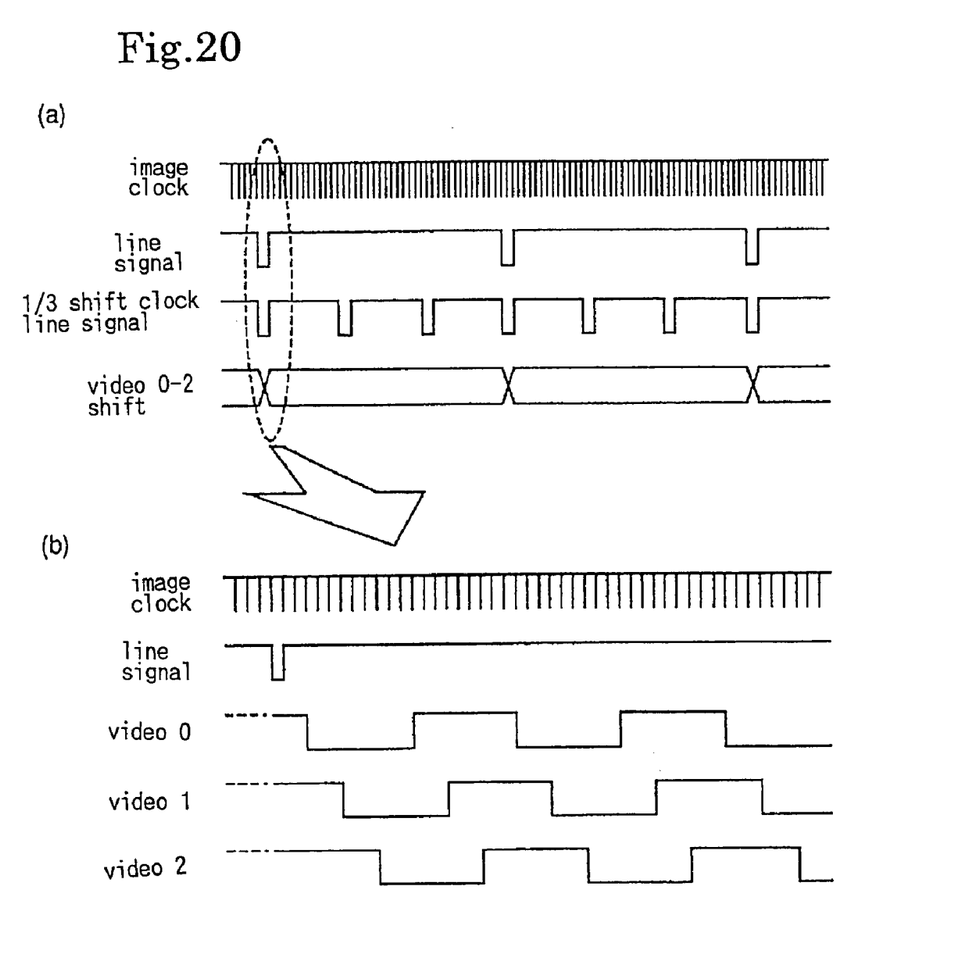
FIG. 20 is timing chart of the print head portion.

FIG. 19 shows a structure of the print head 46. In the timing chart of the print head 46 of FIG. 20, the chart on the lower side (b) is an enlargement of the broken line portion of the chart on the upper side (a). A print head 46 comprises an array 100 of LEDs arranged in a row in the main scanning direction. The video 0 signal, the video 1 signal, and the video 2 signal from the second skew correcting portion 42*b* (FIG. 16) are inputted to three shift registers 102, respectively, and shifted in the line direction by using the image clock as a shift clock. Image data (video 0 signal, video 1 signal, and video 2 signal) in the individual cells of the 3-line shift registers 102 are latched by a three-stage shift register 104 in response to the line synchronizing signal. The video 0 signal, the video 1 signal, and the video 2 signal in the three-stage shift register 104 are shifted with a three-step timing in a direction orthogonal to the shift direction of the shift register 102 in response to a ⅓-line synchronizing signal and outputted to the individual LEDs of the LED array 100.

Although preferred embodiment of the invention have been described in the foregoing detailed description and illustrated in the accompanying drawings, it will be understood that the invention is not limited to the embodiment disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. An image forming apparatus comprising:
a plurality of print heads arranged in a row;
first skew correcting means which correct image data on a line basis in a sub-scanning direction based on the amount of relative inclination between the print heads; and
second skew correcting means which correct the image data corrected by the first correcting means on a unit basis smaller than one line.

2. The apparatus according to claim 1, wherein the first skew correcting means perform the correction in an image memory and second skew correcting means perform the correction in a FIFO memory.

3. The apparatus according to claim 1, wherein the first skew correcting means perform the correction in an image memory and second skew correcting means perform the correction in a print head portion.

4. The apparatus according to claim 1, wherein the amount of inclination is detected as an integral multiple of a unit for correction in the correction performed by the second correcting means on a unit basis smaller than one line.

5. An image forming apparatus comprising:
a plurality of print heads arranged in a row;
a bit map memory;
a read address generator which sequentially generates read addresses from a leading address in the image data region of the bitmap memory;
a write address generator for generating, from the read addresses, write addresses by correcting relative inclination between the print heads on a line basis; and
a memory controller which writes image data to an image data region of the bitmap memory, wherein the leading and rear end portions of the image data region provide respective blank regions, reads from the read addresses generated by the read address generator, image data stored in the image region and writes the image data at the write addresses generated by the write address generator.

6. The apparatus according to claim 5, wherein the dimensions of the blank regions is equal to or larger than the maximum amount of inclination to be corrected.

7. An image forming apparatus comprising:
a bitmap memory having an image data region for storing image data and specified blank regions provided on leading and rear end portions of the image data region;
a read address generating unit for generating read addresses for image data in said bitmap memory based on correction data on relative inclination between the print heads; and
an output unit for reading the image data from the generated read addresses.

8. An image forming apparatus comprising:
a plurality of print heads arranged in a row;
a bitmap memory for storing image data;
a read address generator for consecutively generating read addresses for image data based on relative inclination between the print heads on the unit basis of one burst access; and
a memory controller for reading the image data from the bitmap memory at the read addresses generated by the read address generator.

9. The apparatus according to claim 8, further comprising storing means for temporarily storing the read image data, the storing means having a capacity of at least one line of data, wherein the memory controller comprises a selecting unit for selectively outputting either of the image data read from the bitmap memory and the image data stored in the storing means based on the relative inclination between the print heads.

10. The apparatus according to claim 8, further comprising storing means for temporarily storing the read image data, the storing means having a capacity of at least one line of data and storing, of the data read by a burst access from the addresses generated by the read address generating unit, data of the length of a specified unit for correction.

11. A data processing apparatus comprising:
a memory which stores image data;
first skew correcting means which correct image data on a line basis; and
second skew correcting means which correct the image data corrected by the first correcting means on a unit basis smaller than one line.

12. The apparatus according to claim 11, wherein said first skew correcting means includes a read address generator which sequentially generates read addresses from a leading address in the image data region of a bitmap memory, a write address generator for generating, from the read addresses, write addresses by correcting relative inclination on a line basis and a memory controller which writes image data to an image data region of the bitmap memory, wherein the leading and rear end portions of the image data region provide respective blank regions, reads from the read addresses generated by the read address generator, image data stored in the image region and writes the image data at the write addresses generated by the write address generator.

* * * * *